United States Patent
Kiadeh et al.

(10) Patent No.: US 8,901,899 B1
(45) Date of Patent: Dec. 2, 2014

(54) DC TO DC CONVERTER CONTROL SYSTEMS AND METHODS

(75) Inventors: Mansur Kiadeh, Cupertino, CA (US); Paul Latham, Lee, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 609 days.

(21) Appl. No.: 13/230,311

(22) Filed: Sep. 12, 2011

(51) Int. Cl.
G05F 1/40 (2006.01)

(52) U.S. Cl.
USPC .................. 323/271; 323/282; 323/285

(58) Field of Classification Search
CPC .......... H02M 1/156; H02M 1/158; G05F 1/10
USPC ......................... 323/282–285, 271
See application file for complete search history.

(56) References Cited

U.S. PATENT DOCUMENTS

| | | | | |
|---|---|---|---|---|
| 5,677,618 | A * | 10/1997 | Fiez et al. ..................... | 323/282 |
| 6,313,616 | B1 | 11/2001 | Deller et al. ................... | 323/282 |
| 7,729,140 | B2 | 6/2010 | Ying et al. ...................... | 363/41 |
| 8,384,363 | B2 | 2/2013 | Latham, II et al. ........... | 323/224 |
| 8,541,993 | B2 * | 9/2013 | Notman et al. ................ | 323/271 |
| 8,542,046 | B2 * | 9/2013 | Roytman et al. ............... | 327/175 |
| 2001/0054883 | A1 * | 12/2001 | Rincon-Mora ................ | 323/280 |
| 2004/0095020 | A1 * | 5/2004 | Kernahan et al. ............. | 307/35 |
| 2007/0114985 | A1 * | 5/2007 | Latham et al. ................. | 323/283 |
| 2007/0236200 | A1 * | 10/2007 | Canfield et al. ............... | 323/284 |
| 2008/0030182 | A1 * | 2/2008 | Sutardja et al. ............... | 323/283 |
| 2008/0284398 | A1 * | 11/2008 | Qiu et al. ....................... | 323/283 |
| 2009/0027025 | A1 * | 1/2009 | Latham et al. ................. | 323/283 |
| 2010/0127681 | A1 * | 5/2010 | Kenly et al. ................... | 323/282 |
| 2011/0121797 | A1 * | 5/2011 | Daniel ............................ | 323/265 |
| 2012/0217940 | A1 * | 8/2012 | Kiadeh et al. ................. | 323/271 |

FOREIGN PATENT DOCUMENTS

WO   WO2011151940   *   8/2011

OTHER PUBLICATIONS

S. Saggini, W. Stefanutti, P. Mattavelli and A. Carrera Efficiency Estimation in Digitally-Controlled dc-dc Buck Converters based on Single Current Sensing Jun. 15-19, 2008 Power Electronics Specialists Conference, 2008. PESC 2008. IEEE; pp. 3581-3586.*

Abe, N. et al., "Smith Predictor Control and Internal Model Control—A Tutorial—", SICE Annual Conference in Funkui, Fukui Universtiy, Japan, PR0001/03/0000-1257 Aug. 4-6, 2003, p. 1383-1387.

* cited by examiner

Primary Examiner — Timothy J Dole
Assistant Examiner — Shahzeb K Ahmad

(57) ABSTRACT

An error determination module determines a voltage error based on an output voltage of a DC to DC converter, an estimated output voltage of the DC to DC converter, and a product of a predetermined delay value and a difference between a duty cycle and a target voltage. A capacitor current determination module determines a capacitor current based on the voltage error. A capacitor voltage determination module determines a capacitor voltage based on the voltage error. A duty cycle module sets the duty cycle for a sampling period based on the capacitor current and the capacitor voltage. A pulse width modulation (PWM) module controls a switching duty cycle of the DC to DC converter based on the duty cycle.

21 Claims, 5 Drawing Sheets

DC TO DC CONVERTER CONTROL SYSTEMS AND METHODS

CROSS-REFERENCE TO RELATED APPLICATIONS

This application is related to U.S. patent application Ser. No. 13/034,005 filed on Feb. 24, 2011. The disclosure of the above application is incorporated herein by reference in its entirety.

FIELD

The present disclosure relates to control systems for power supplies and more particularly to systems and methods for direct current (DC) to DC converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply outputs a predetermined voltage that may be used to power one or more components. For example, the predetermined voltage may power one or more components of an integrated circuit (IC). In some situations, however, a voltage that is less than the predetermined voltage may be sufficient. The lower voltage may be obtained from the predetermined voltage using a voltage divider circuit. Voltage divider circuits, however, are inefficient and inaccurate.

A step-down ("buck") converter may be implemented to provide the lower voltage. Under a given set of conditions, a buck converter is generally more efficient and more accurate than a voltage divider circuit. A buck converter may include an inductor, a capacitor, and two switches. The buck converter alternates between charging the inductor by connecting the inductor to the predetermined voltage and discharging the inductor to a load. In other situations, a voltage that is greater than the predetermined voltage may be sufficient. A step-up ("boost") converter may be implemented to provide the higher voltage.

SUMMARY

A control system for a DC to DC converter includes an error determination module, a capacitor current determination module, a capacitor voltage determination module, a duty cycle module, and a pulse width modulation (PWM) module. The error determination module determines a voltage error based on an output voltage of the DC to DC converter, an estimated output voltage of the DC to DC converter, and a product of a predetermined delay value and a difference between a duty cycle and a target voltage. The capacitor current determination module determines a capacitor current based on the voltage error. The capacitor voltage determination module determines a capacitor voltage based on the voltage error. The duty cycle module sets the duty cycle for a sampling period based on the capacitor current and the capacitor voltage. The PWM module controls a switching duty cycle of the DC to DC converter based on the duty cycle.

A control method for a DC to DC converter includes: determining a voltage error based on an output voltage of the DC to DC converter, an estimated output voltage of the DC to DC converter, and a product of a predetermined delay value and a difference between a duty cycle and a target voltage; determining a capacitor current based on the voltage error; determining a capacitor voltage based on the voltage error; setting the duty cycle for a sampling period based on the capacitor current and the capacitor voltage; and controlling a switching duty cycle of the DC to DC converter based on the duty cycle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
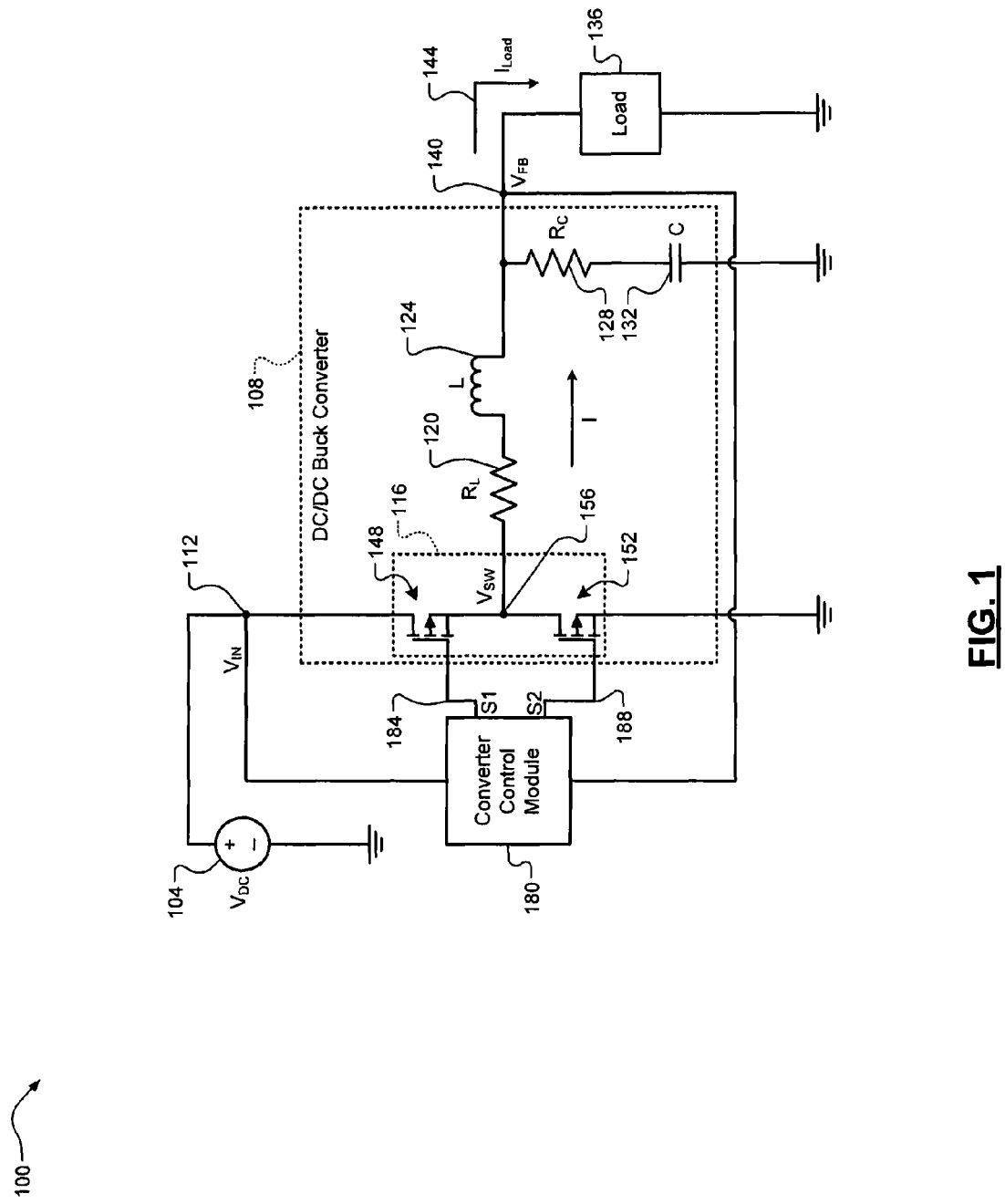
FIG. 1 is a functional block diagram of an example direct current (DC) to DC converter system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A direct current (DC) to DC converter receives an input voltage and generates an output voltage. A converter control module measures the output voltage of the DC to DC converter. The converter control module controls switching of one or more switches of the DC to DC converter to maintain the output voltage at approximately a target voltage.

The converter control module estimates the value of the output voltage and compares the estimated value to the measured value of the output voltage. The converter control module estimates the value of the output voltage based on a predicted capacitor voltage and a predicted capacitor current. The converter control module also determines a capacitor voltage and a capacitor voltage based on the predicted capacitor voltage and the predicted capacitor current.

A system of functions can be developed for determining the predicted capacitor voltage and current, the capacitor voltage and current, and the estimated value of the output voltage. For example only, for an example buck converter, the following functions can be used to determine the predicted capacitor voltage and current, the capacitor voltage and current, and the estimated value of the output voltage:

$$X_P(n+1) = \begin{bmatrix} \text{Predicted } V_{CAP}(n+1) \\ \text{Predicted } I_{CAP}(n+1) \end{bmatrix} = A_d \cdot X_C(n) + B_d \cdot u(n)$$

$$X_C(n) = \begin{bmatrix} V_{CAP}(n) \\ I_{CAP}(n) \end{bmatrix} = X_P(n) + C_d \cdot V_{ERROR}(n)$$

$$V_{EST}(n) = C_d \cdot X_P(n) + K_{DLY} \cdot u(n-1).$$

Predicted $V_{CAP}(n+1)$ is the predicted capacitor voltage for a next sampling period, Predicted $I_{CAP}(n+1)$ is a predicted capacitor current for the next sampling period, $V_{CAP}(n)$ is the capacitor voltage, and $V_{ERROR}(n)$ is a difference between the measured and estimated values of the output voltage. $V_{EST}(n)$ is the estimated value of the output voltage, $I_{CAP}$ is the capacitor current, $u(n-1)$ corresponds to the switching duty cycle from a last sampling period, and $A_d$, $B_d$, $C_d$, and $K_{DLY}$ are matrices generated based on the characteristics of the DC to DC buck converter.

The number of multipliers implemented within the converter control module to execute the above functions may be based on the number of entries of the $A_d$, $B_d$, and $C_d$ matrices that are different. As the number of multipliers implemented increases, however, the die (chip) size also increases.

One or more matrix transformations can be performed to generate A, B, and C matrices that can be used in the above functions in place of the $A_d$, $B_d$, and $C_d$ matrices and that have one or more common entries. For example only, a similarity transform can be performed to yield $A_S$, $B_S$, and $C_S$ matrices that are similar to the $A_d$, $B_d$, and $C_d$ matrices, respectively. A delta transform can also be performed based on the $A_S$, $B_S$, and $C_S$ matrices and the $A_d$, $B_d$, and $C_d$ matrices to generate delta transform matrices $A_\Delta$, $B_\Delta$, and $C_\Delta$ that have one or more common entries. With one or more common entries, the order of operations of the converter control module can be selected to minimize the number of multipliers and, therefore, minimize the die size.

Referring now to FIG. 1, a diagram of an example implementation of a direct current (DC) to DC buck converter (power supply) system 100 is shown. The buck converter system 100 may be implemented, for example, with a hard disk drive (HDD) spindle and actuator control system, a mirror control system, a camera lens actuator system, or another suitable type of system.

A DC power source 104 inputs DC power to a DC to DC buck converter 108. A voltage input to the buck converter 108 will be referred to as an input voltage ($V_{IN}$) 112. The buck converter 108 may include a switching module 116, a first resistor ($R_L$) 120, an inductor (L) 124, a second resistor ($R_C$) 128, and a capacitor (C) 132. While the first and second resistors 120 and 128 are shown, the first and second resistors 120 and 128 may be illustrative of the equivalent series resistances (ESRs) of the inductor 124 and the capacitor 132, respectively, and not actually included in the buck converter 108 (e.g., see FIG. 2).

The buck converter 108 outputs DC power to a load 136. The voltage output by the buck converter 108 may be provided as a feedback voltage ($V_{FB}$) 140. The current through the load 136 will be referred to as a load current ($I_{LOAD}$) 144. In various implementations, a DC to DC buck converter (not shown) may include one or more buck converters, such as the buck converter 108, connected in parallel to collectively output DC power to the load 136.

The switching module 116 includes a first switch 148 and a second switch 152. For example only, the first and second switches 148 and 152 may be field effect transistors (FETs) as shown in the example of FIG. 1. In various implementations, such as in the example of FIG. 1, the first and second switches 148 and 152 may be p-type, enhancement FETs. The first switch 148 and/or the second switch 152 may be another suitable type of switch.

In the example of FIG. 1, a source terminal of the first switch 148 is connected to the input voltage 112, and a drain terminal of the first switch 148 is connected to a source terminal of the second switch 152. The drain terminal of the second switch 152 is connected to ground. A first end of the first resistor 120 is connected to a first end of the inductor 124. A second end of the first resistor 120 is connected to a node 156 between the drain terminal of the first switch 148 and the source terminal of the second switch 152. A voltage at the node 156 will be referred to as a switching voltage ($V_{Sw}$). A second end of the inductor 124 is connected to a first end of the second resistor 128. A second end of the second resistor 128 may be connected to one terminal of the capacitor 132. The other terminal of the capacitor 132 may be connected to ground.

The feedback voltage 140 may be measured at a node between the inductor 124 and the second resistor 128. The switching module 116 controls connection and disconnection of the inductor 124 and the input voltage 112. Gate terminals of the first and second switches 148 and 152 are connected to a converter control module 180. In various implementations, such as implementations where the load current is less than a predetermined current (e.g., 5 amps), the converter control module 180 and the buck converter 108 may be implemented on one chip. In other implementations, such as in implementations where the load current is greater than the predetermined current, the buck converter 108 and the converter control module 180 may be implemented on separate chips.

The converter control module 180 controls operation of the first and second switches 148 and 152. The converter control module 180 controls first and second switches 148 and 152 using pulse width modulation (PWM). More specifically, the converter control module 180 generates first and second PWM signals 184 and 188 (S1 and S2) that are applied to the gate terminals of the first and second switches 148 and 152, respectively.

The converter control module 180 varies the duty cycle of the first and second PWM signals 184 and 188 to control the output of the buck converter 108. The duty cycle of a signal may refer to a percentage of a predetermined period (e.g., a control loop) that the signal is in an active state.

The converter control module 180 may generate the first and second PWM signals 184 and 188 such that the first and second PWM signals 184 and 188 are substantially complementary. In other words, the first PWM signal 184 applied to the gate terminal of the first switch 148 is generally opposite in polarity to the second PWM signal 188 provided to the second switch 152. A short circuit condition may occur when both of the first and second switches 148 are on. For example only, a short circuit condition may occur when one of the first and second switches 148 and 152 is switched on before the other one of the first and second switches 148 and 152 is switched off. To avoid a short circuit condition, the first and second switches 148 and 152 may both be turned off during a deadtime period before one of the first and second switches 148 and 152 is turned on. Therefore, two signals being substantially complementary may mean that the two signals are opposite in polarity most of the time during switching. However, around transitions, the first and second PWM signals 184 and 188 may be in the same state for a short period.

When the first switch 148 is on and the second switch 152 is off, the inductor 124 is connected to the input voltage 112, thereby charging the inductor 124 and the capacitor 132. When the first switch 148 is off and the second switch 152 is on, the inductor 124 is disconnected from the input voltage 112, and the inductor 124 and the capacitor 132 discharge energy. The converter control module 180 may control the first and second PWM signals 184 and 188 to maintain the feedback voltage 140 at approximately a predetermined (e.g., target) voltage. The predetermined voltage is less than the input voltage 112.

Generally, for every circuit that generates an output based on an input, a delay period exists between a time that a change in the input is made and a time that the output reflects the change in the input. In the buck converter system 100, for example, there is a delay period between a first time that the converter control module 180 changes the duty cycle and a second time that the output of the buck converter 108 reflects the change in the duty cycle. For example only, in the buck converter system 100, the delay period may include: a first delay period associated with measuring the feedback voltage 140 and generating a discrete value based on the feedback voltage 140; a second delay period associated with determining and outputting the duty cycle based on the feedback voltage 140 and the discrete value; and a third delay period associated with transitioning a switch from on to off or vice versa. The first delay period will be referred to as an analog to digital conversion (ADC) delay, the second delay period will be referred to as a computation delay, and the third delay period will be referred to as a switching delay.

The converter control module 180 samples the feedback voltage 140 at sampling times that are each separated by a predetermined period. In other words, the converter control module 180 samples the feedback voltage 140 at predetermined intervals. The converter control module 180 generates estimates of the feedback voltage 140 for the sampling periods. The converter control module 180 controls the duty cycle in closed-loop based on the feedback voltage 140 for a given sampling period and the estimate of the feedback voltage 140 for the given sampling period.

Figure 2:
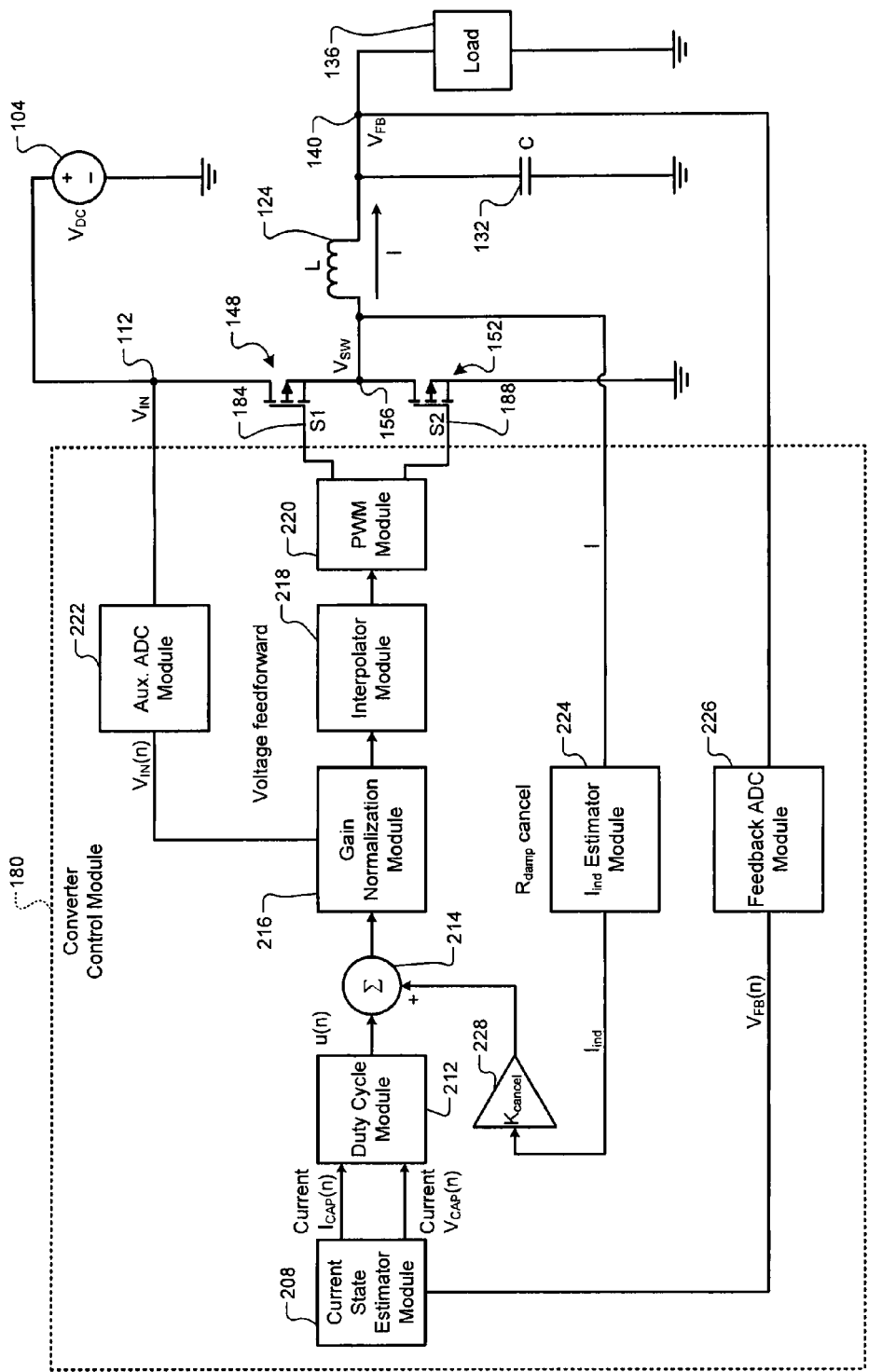
FIG. 2 is a functional block diagram of an example of a converter control module according to the present disclosure.

Referring now to FIG. 2, a functional block diagram of an example implementation of the converter control module 180 is presented. The converter control module 180 may include a current state estimator module 208, a duty cycle module 212, a summing module 214, a gain normalization module 216, an interpolator module 218, a pulse width modulation (PWM) module 220, an auxiliary analog-to-digital converter (ADC) module 222, an inductor current ($I_{ind}$) estimator module 224, and a feedback ADC module 226.

The current state estimator module 208 estimates switch states of the buck converter 108. For example, in buck topology, the switch states include charging, discharging, and tri-state. In buck-boost topology, the switch states include buck, boost, buck-boost, short across the inductor, and open. Many other switch states are possible in other topologies, which include forward, fly-back, SEPIC, Cuk, etc. The present disclosure is also applicable to other control systems such as, but not limited to, motor control systems. The feedback ADC module 226 provides the current state estimator module 208 feedback regarding the output voltage Vout of the buck converter 108. The current state estimator module 208 estimates the switch states based on the feedback received from the feedback ADC module 226.

The duty cycle module 212 calculates a duty cycle (u(n)) for PWM pulses that drive the switches of the buck converter 108. The duty cycle module 212 calculates the duty cycle based on the output of the current state estimator module 208. The output of the current state estimator module 208 is discussed in detail below.

The summing module 224 adds the output of the duty cycle module 212 and feedback of an estimated inductor current $I_{ind}$, which is estimated by the $I_{ind}$ estimator module 224 and adjusted by a gain module 228 having a gain $K_{cancel}$. The feedback is used to cancel effects of $R_{damp}$ on the output voltage $V_{out}$, where $R_{damp}=R_{ind}+R_{on}$, and where $R_{on}$ is the on-resistance of the switches 148 and 152.

The gain normalization module 216 normalizes gain of the output of the summing module 214. The normalization module 216 receives an input from the auxiliary ADC module 222, which converts the input supply voltage $V_{in}$ 112 into a digital format and outputs voltage feedforward information in the digital format to the gain normalization module 216. The gain normalization module 216 normalizes the gain of the output of the summing module 214 based on the voltage feedforward information received from the auxiliary ADC module 222.

The interpolator module 218 interpolates the output of the gain normalization module 216. The PWM module 222 generates the PWM pulses having the duty cycle determined by the duty cycle module 216, normalized by the gain normalization module 216, and interpolated by the interpolator module 218. The PWM pulses drive the switches 148 and 152 according to the duty cycle.

The current state estimator module 208 may be referred to as a current time estimator (CTE). CTEs differ from prediction time estimators (PTEs) in that CTEs determine current values of parameters for use in controlling a system while PTEs predict future values of the parameters for use in controlling the system.

The following linear (continuous) equations can be derived for the buck converter 108:

$$L\frac{di(t)}{dt} = v_{SW}(t) - R_L i(t) - v_{FB}(t);$$

$$C\frac{dv(t)}{dt} = i(t) - i_{LOAD}(t); \text{ and}$$

$$v_{FB}(t) = v(t) + R_C(i(t) - i_{LOAD}(t)),$$

where L is the inductance of the inductor 124, $v_{SW}(t)$ is the switching voltage at the node 156 at a given time (t), $R_L$ is the resistance of the first resistor 120, C is the capacitance of the capacitor 132, i(t) is the current through the capacitor 132 at the given time (t), $v_{FB}(t)$ is the feedback voltage 140 at the given time (t), v(t) is the capacitor voltage at the given time (t), $i_{LOAD}(t)$ is the load current 144 at the given time (t), and $R_C$ is the resistance of the second resistor 128.

The linear equations can be rewritten in matrix form as:

$$\frac{d}{dt}\begin{bmatrix} v(t) \\ i(t) \end{bmatrix} = \begin{bmatrix} 0 & \frac{1}{C} \\ \frac{-1}{L} & \frac{-(R_C + R_L)}{L} \end{bmatrix}\begin{bmatrix} v(t) \\ i(t) \end{bmatrix} + \begin{bmatrix} 0 & \frac{1}{C} \\ \frac{1}{L} & \frac{R_C}{L} \end{bmatrix}\begin{bmatrix} v_{SW}(t) \\ i_{LOAD}(t) \end{bmatrix};$$

and $$v_{FB}(t) = [1 \quad R_C]x(t).$$

The matrix form equations can be rewritten in continuous state space form for a given time (t) as:

$$\frac{dx(t)}{dt} = A_c \cdot x(t) + B_c \cdot u(t);$$

and $$v_{FB}(t) = C_c \cdot x(t),$$

where $A_C$, $B_C$, and $C_c$ are continuous matrices, u(t) is a voltage corresponding to the duty cycle of the first PWM signal 184 at the given time (t), and dx(t)/dt is a 2×1 matrix with an entry for the capacitor voltage at the given time (v(t)) and an entry for the capacitor current at the given time (i(t)). For example only, $$A_c = \begin{bmatrix} 0 & \frac{1}{C} \\ \frac{-1}{L} & \frac{-R_t}{L} \end{bmatrix}; B_c = \begin{bmatrix} 1 \\ \frac{1}{L} \end{bmatrix}; C_c = [1 \quad R_c]; \text{ and } \frac{dx(t)}{dt} = \begin{bmatrix} v(t) \\ i(t) \end{bmatrix},$$

where $R_t$ is equal to the sum of $R_{FET}$ and $R_c$, $R_{FET}$ is the total RDS(on) of the first and second switches 148 and 152, v(t) is the capacitor voltage at the given time, and i(t) is the capacitor current at the given time.

The continuous state space equations can be rewritten for a given sampling period (n) in the discrete domain as:

$$X_p(n+1) = A_d \cdot X_C(n) + B_d \cdot u(n); \text{ and}$$

$$V_{FB}(n) = C_d \cdot X_C(n),$$

where $X_C(n)$ is a 2×1 matrix with entries representing values of the capacitor voltage and the capacitor current for the current sampling period (n), $X_P(n+1)$ is a 2×1 matrix with entries representing predicted values of the capacitor voltage and the capacitor current for a next sampling period (n+1) after the current sampling period (n), and u(n) is a voltage corresponding to the duty cycle of the first PWM signal 184 for the current sampling period (n). $A_d$, $B_d$, and $C_d$ are discrete matrices corresponding to the continuous matrices $A_c$, $B_c$, and $C_c$, respectively. For example only, the $A_d$, $B_d$, and $C_d$ matrices can be represented by:

$$A_d = \begin{bmatrix} 1 & \frac{T_S}{C} \\ -\frac{T_S}{L} & 1 - \frac{T_S R_C}{L} \end{bmatrix}; B_d = \begin{bmatrix} 0 \\ \frac{T_s}{L} \end{bmatrix}; \text{ and } C_d = [1 \quad R_C],$$

where $T_S$ is the sampling interval (period). The $X_C(n)$ and $X_P(n+1)$ matrices can be represented as:

$$X_P(n+1) = \begin{bmatrix} \text{Predicted } V_{CAP}(n+1) \\ \text{Predicted } I_{CAP}(n+1) \end{bmatrix};$$

and $$X_C(n) = \begin{bmatrix} \text{Current } V_{CAP}(n) \\ \text{Current } I_{CAP}(n) \end{bmatrix},$$

where Predicted $V_{CAP}(n+1)$ is the predicted value of the capacitor voltage for the next sampling period (n+1), Predicted $I_{CAP}(n+1)$ is the predicted value of the capacitor current for the next sampling period (n+1), Current $V_{CAP}(n)$ is the value of the capacitor voltage for the current sampling period (n), and Current $I_{CAP}(n)$ is the value of the capacitor current for the current sampling period (n).

By performing a similarity transform, matrices $A_s$, $B_s$, and $C_s$ can be obtained, where the $A_s$, $B_s$, and $C_s$ matrices are similar to the $A_d$, $B_d$, and $C_d$ matrices, respectively. The similarity transform may be described by:

$$A_s = T^{-1}A_d T;$$

$$B_s = T^{-1}B_d; \text{ and}$$

$$C_s = C_d T,$$

where T is a transform matrix. For example only, T may be represented as:

$$T = \begin{bmatrix} 1 & 0 \\ 0 & \sqrt{\frac{C}{L}} \end{bmatrix}$$

By performing a delta transform, $A_\Delta$, $B_\Delta$, and $C_\Delta$ matrices can be obtained based on the similar matrices $A_s$, $B_s$, and $C_s$, respectively. The $A_\Delta$, $B_\Delta$, and $C_\Delta$ matrices can be represented as:

$$A_\Delta = \begin{bmatrix} 0 & \frac{T_S}{\sqrt{LC}} \\ -\frac{T_S}{\sqrt{LC}} & \frac{T_S R_C}{L} \end{bmatrix}; B_\Delta = \begin{bmatrix} 0 \\ \frac{T_S}{\sqrt{LC}} \end{bmatrix};$$

and $$C_\Delta = \begin{bmatrix} 1 & RC\sqrt{\frac{C}{L}} \end{bmatrix}.$$

Because $T_S$, L, C, and $R_C$ are constant values, the following terms can be defined:

$$wnts = \frac{T_S}{\sqrt{LC}}; rlts = \frac{T_S * R_t}{L};$$

and $$yrc = R_C\sqrt{\frac{C}{L}},$$

where wnts is an impedance conversion value, rlts is a total resistance (damping) conversion value, and yrc is a conversion value for the ESR of the capacitor 132 (capacitor ESR conversion value).

By substituting wnts, rlts, and yrc into the $A_\Delta$, $B_\Delta$, and $C_\Delta$ matrices, the $A_\Delta$, $B_\Delta$, and $C_\Delta$ matrices can be rewritten as:

$$A_\Delta = \begin{bmatrix} 1 & wnts \\ -wnts & 1-rlts \end{bmatrix}; B_\Delta = \begin{bmatrix} \frac{wnts^2}{2} \\ wnts \end{bmatrix};$$

and $$C_\Delta = [1 \quad yrc].$$

The current state estimator module 208 determines the estimated value of the feedback voltage, a value of the capacitor voltage, and a value of capacitor current based on the $A_\Delta$, $B_\Delta$, and $C_\Delta$ matrices. Because the wnts entry appears more than once in the $A_\Delta$, $B_\Delta$, and $C_\Delta$ matrices, the number of multipliers implemented within the converter control module 180 can be reduced relative to a converter control module using the $A_\Delta$, $B_\Delta$, and $C_\Delta$ matrices.

The current state estimator module 208 may generate a voltage error value for the given sampling period ($V_{ERROR}(n)$) based on the feedback voltage value for the given sampling period ($V_{FB}(n)$) and an estimated value of the feedback voltage value for the given sampling period ($V_{EST}(n)$). For example only, the current state estimator module 208 may set the voltage error value equal to the feedback voltage value minus the estimated value.

The current state estimator module 208 generates the estimated value for the given sampling period ($V_{EST}(n)$) based on a predicted state of the output of the buck converter 108 at the given sampling period ($X_P(n)$), the duty cycle for the last sampling period before the given sampling period (u(n−1)), and a delay parameter ($K_{DLY}$). The last sampling period before the given sampling period (n) may be represented as n−1. The current state estimator module 208 may generate the estimated value for the given sampling period using, for example, the equation:

$$V_{EST}(n) = C_\Delta \cdot X_P(n) + K_{DLY} \cdot u(n-1),$$

where $V_{EST}(n)$ is the estimated value for the given sampling period (n), $K_{DLY}$ is the delay parameter, and u(n−1) is the duty cycle at the last sampling period (n−1). $C_\Delta$ is the 1×2 matrix:

$$C_\Delta = [1 \, yrc], \text{ and}$$

$X_P(n)$ is the 2×1 matrix:

$$X_P(n) = \begin{bmatrix} \text{Predicted } V_{CAP}(n) \\ \text{Predicted } I_{CAP}(n) \end{bmatrix}.$$

The delay parameter may be a predetermined value set based on the computation and switching delays. In various implementations, such as in adaptive systems, the delay parameter may be variable.

The current state estimator module 208 generates the predicted state of the output of the buck converter 108 for the next sampling period $X_P(n+1)$. The current state estimator module 208 may generate the predicted state for the next sampling period based on the current state of the output of the buck converter 108 for the given sample period ($X_C(n)$) and the duty cycle for the given sample period (u(n)). For example only, the current state estimator module 208 may generate the predicted state for the next sample period ($X_P(n+1)$) using, for example, the equation:

$$X_P(n+1) = A_\Delta \cdot X_C(n) + B_\Delta \cdot u(n)$$

where $$X_P(n+1) = \begin{bmatrix} \text{Predicted } V_{CAP}(n+1) \\ \text{Predicted } I_{CAP}(n+1) \end{bmatrix}; A_\Delta = \begin{bmatrix} 1 & wnts \\ -wnts & 1-rlts \end{bmatrix};$$

$$B_\Delta = \begin{bmatrix} \frac{wnts^2}{2} \\ wnts \end{bmatrix}; wnts = \frac{T_S}{\sqrt{LC}};$$

and $$rlts = \frac{T_S * R_t}{L}.$$

The current state estimator module 208 applies an estimator gain ($K_{LC}$) to the voltage error value. The estimator gain ($K_{LC}$) may be set to adjust the voltage error value based on inaccuracy in the estimated value of the feedback voltage ($V_{EST}$). The estimator gain is a 2×1 matrix such that the result of:

$$K_{LC} * V_{ERROR}$$

is also a 2×1 matrix. One entry of the 2×1 $K_{LC}$ matrix may be a (current) capacitor voltage correction value ($KLC_I$), and the other entry of the 2×1 $K_{LC}$ matrix may be (current) capacitor current correction value ($KLC_V$). For example only, the $K_{LC}$ matrix can be represented as:

$$K_{LC} = \begin{bmatrix} KLC_V \\ KLC_I \end{bmatrix},$$

where $KLC_V$ is the capacitor voltage correction value and $KLC_I$ is the capacitor current correction value. The capacitor voltage correction value and the capacitor current correction value may be predetermined values. The result of the application of the estimator gain to the voltage error value for the given sampling period (n) will be referred to as the adjusted voltage error value ($V_{ERR-ADJ}(n)$).

The current state estimator module 208 determines the state of the output of the buck converter 108 for the current sampling period ($X_C(n)$) based on the predicted state of the output of the buck converter 108 for the current sampling period ($X_P(n)$). The current state estimator module 208 determines the state of the output of the buck converter 108 for the current sampling period ($X_C(n)$) further based on the adjusted voltage error value for the current sampling period ($V_{ERR\text{-}ADJ}(n)$). For example only, the current state estimator module 208 may set the state of the output of the buck converter 108 for the given sampling period (n) equal to the sum of the predicted state of the output and the adjusted voltage error value. The state of the output of the buck converter 108 for the current sampling period ($X_C(n)$) can be represented as:

$$X_C(n) = \begin{bmatrix} \text{Current } V_{CAP}(n) \\ \text{Current } I_{CAP}(n) \end{bmatrix},$$

where Current $V_{CAP}(n)$ is the value of the capacitor voltage for the given period (n), and Current $I_{CAP}(n)$ is the value of the capacitor current at the given period (n).

The duty cycle module 212 sets the duty cycle for the given sampling period (u(n)) based on the current state of the output of the buck converter 108 ($X_C(n)$) and a feedback gain ($K_{FB}$). For example only, the duty cycle module 212 may set the duty cycle using, for example, the equation:

$$u(n) = K_{FB} \cdot X_C(n),$$

where $K_{FB}$ is a two entry matrix. In various implementations, one entry of the $K_{FB}$ matrix may be a predetermined value for the capacitor voltage and the other entry may be a predetermined value for the capacitor current.

Figure 3:
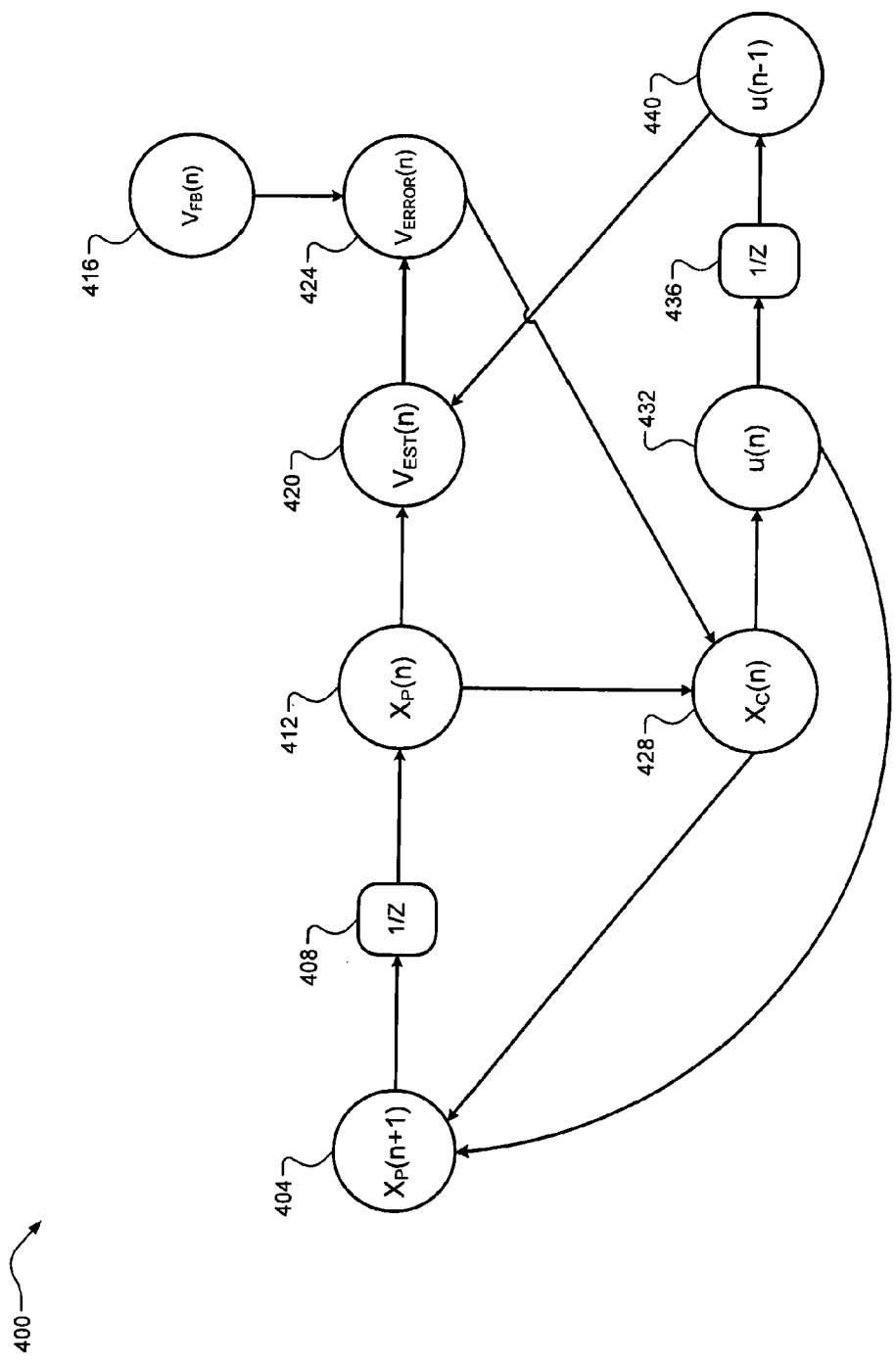
FIG. 3 is a state diagram of an example method of estimating feedback voltage, capacitor current, and capacitor voltage for a DC to DC converter according to the present disclosure.

Referring now to FIG. 3, a state diagram depicting an example method 400 of controlling the buck converter 108 is presented. At 404, control generates the predicted state of output of the buck converter 108 for the next sampling period ($X_P(n+1)$) based on the current state of the output of the buck converter 108 for the present sampling period ($X_C(n)$) and the duty cycle for the present sampling period (u(n)).

Control delays the use of the predicted state of output of the buck converter 108 by one sampling period at 408. Control receives the predicted state of the output of the buck converter 108 for the present sampling period ($X_P(n)$) at 412 (previously generated as $X_P(n+1)$). Control also receives the feedback voltage value for the present sampling period ($V_{FB}(n)$) at 416.

Control generates the estimated value of the feedback voltage value for the present sampling period ($V_{EST}(n)$) at 420 based on the predicted state of the output of the buck converter 108 for the present sampling period ($X_P(n)$) and the duty cycle for the last sampling period (u(n−1)). Control generates the voltage error value for the present sampling period ($V_{ERROR}(n)$) at 424 based on the feedback voltage value for the present sampling period ($V_{FB}(n)$) and the estimated value of the feedback voltage value for the present sampling period ($V_{EST}(n)$). Control generates the current state of the output of the buck converter 108 for the present sampling period ($X_C(n)$) at 428 based on the voltage error value ($V_{ERROR}(n)$) and predicted state of the output of the buck converter 108 for the present sampling period ($X_P(n)$).

Control generates the duty cycle for the present sampling period (u(n)) at 432 based on the current state of the output of the buck converter 108 at the present sampling period ($X_C(n)$). Control delays use of the duty cycle for the present sampling period at 436 by one sampling period. In this manner, for the next sampling period, control will generate the estimated value of the feedback voltage based on the duty cycle for the previous sampling period 440 at 420. The sampling period at 436 may be different than the sampling period at 408. For example only, the sampling period at 408 may be shorter than the sampling period at 436.

Figure 4:
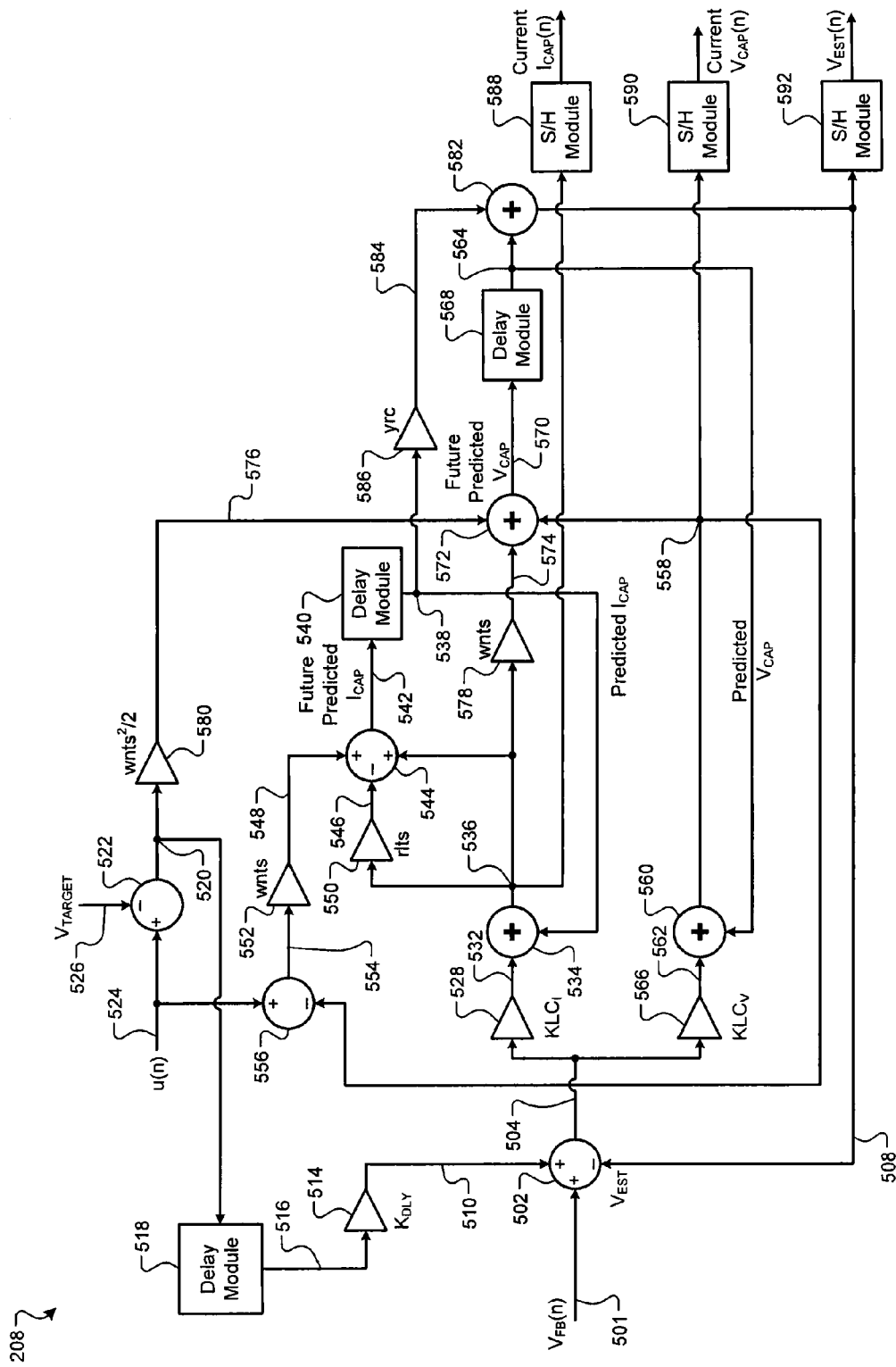
FIG. 4 is a functional block diagram of an example of a current state estimator module according to the present disclosure.

Referring now to FIG. 4, a functional block diagram of an example of the current state estimator module 208 is presented. By using the parameters of the $A_A$, $B_A$, and $C_A$ matrices and changing the order that the operations are performed, the number of multipliers implemented within the current state estimator module 208 can be reduced. Die (chip) size may decrease as the number of multipliers decreases. Power consumption attributable to the multipliers and the computation delay of the converter control module 180 may also decrease.

An error determination module 502 determines the voltage error ($V_{ERROR}$) 504 based on the feedback voltage ($V_{FB}(n)$) 501, the estimated value of the feedback voltage ($V_{EST}$) 508, and a computation delay voltage 510. The error determination module 502 may set the voltage error 504 equal to the feedback voltage 140 plus the computation delay voltage 510 minus the estimated value of the feedback voltage 508.

A first multiplier module 514 determines the computation delay voltage 512 based on the delay parameter ($K_{DLY}$) and a previous voltage difference 516. More specifically, the first multiplier module 514 may set the computation delay voltage 512 to the delay parameter multiplied by the previous voltage difference 516. A delay module 518 is a one sampling period delay buffer. The delay module 518 receives a voltage difference 520, stores the voltage difference 520 for a first sampling period, and then outputs the stored value as the previous voltage difference 516.

A voltage difference determination module 522 determines the voltage difference 520 based on the duty cycle (u(n)) 524 and a target voltage ($V_{TARGET}$) 526. The target voltage 526 may be a predetermined value for the voltage output of the buck converter 108. The voltage difference determination module 522 may set the voltage difference 520 to the duty cycle 524 minus the target voltage 526.

A second multiplier module 528 receives the voltage error 504. The second multiplier module 528 determines a capacitor current adjustment 532 based on the voltage error 504 and the capacitor current correction value ($KLC_I$). The second multiplier module 528 may set the capacitor current adjustment 532 to the voltage error 504 multiplied by the capacitor current correction value.

A present capacitor current determination module 534 determines the value of the capacitor current (Current $I_{CAP}$) 536 based on the capacitor current adjustment 532 and a predicted capacitor current (Predicted $I_{CAP}$) 538. The present capacitor current determination module 534 may set the capacitor current 536 to the capacitor current adjustment 532 plus the predicted capacitor current 538.

A delay module 540 is a one sampling period delay buffer. The delay module 540 receives a future predicted capacitor current for a next sampling period (Future Predicted $I_{CAP}$) 542, stores the future predicted capacitor current 542 for a second sampling period, then outputs the stored value as the predicted capacitor current 538. The second sampling period is less than the first sampling period. For example only, the second sampling period may be one-half, one-fourth, one-eighth or another suitable fraction of the first sampling period.

A future current determination module 544 determines the future predicted capacitor current 542 based on a first current 546, a second current 548, and the current capacitor current 536. The future current determination module 544 may set the future predicted capacitor current 542 to the first current 546 plus the current capacitor current 536 minus the second current 548.

A third multiplier module 550 determines the first current 546 based on the current capacitor current 536 and the total resistance (damping) conversion value (its). The third multiplier module 550 may set the first current 546 to the current capacitor current 536 multiplied by the total resistance conversion value. A fourth multiplier module 552 determines the second current 548 based on an inductor voltage 554 and the impedance conversion value (wnts). The fourth multiplier module 552 may set the second current 548 to the inductor voltage 554 multiplied by the impedance conversion value. A second voltage difference module 556 determines the inductor voltage 554 based on the duty cycle 524 and the current capacitor voltage 558. The second voltage difference module 556 may set the inductor voltage 554 to the duty cycle 524 minus the current capacitor voltage 558.

A present capacitor voltage determination module 560 determines the capacitor voltage 558 based on a capacitor voltage adjustment 562 and a predicted capacitor voltage (Predicted $V_{CAP}$) 564. The present capacitor voltage determination module 560 may set the capacitor voltage 558 to the capacitor voltage adjustment 562 plus the predicted capacitor voltage 564.

A fifth multiplier module 566 determines the capacitor voltage adjustment 562 based on the voltage error 504 and the capacitor voltage correction value ($KLC_V$). The fifth multiplier module 566 may set the capacitor voltage adjustment 562 to the voltage error 504 multiplied by the capacitor voltage correction value.

A delay module 568 is a one sampling period delay buffer. The delay module 568 receives a future predicted capacitor voltage for a next sampling period (Future Predicted $V_{CAP}$) 570, stores the future predicted capacitor voltage 570 for the second sampling period, then outputs the stored value as the predicted capacitor voltage 564. As stated above, the second sampling period is less than the first sampling period.

A future voltage determination module 572 determines the future predicted capacitor voltage 570 based on a first voltage 574, a second voltage 576, and the current capacitor voltage 558. The future voltage determination module 572 may set the future predicted capacitor voltage 570 to the first voltage 574 plus the second voltage 576 plus the current capacitor voltage 558.

A sixth multiplier module 578 determines the first voltage 574 based on the current capacitor current 536 and the impedance conversion value (wnts). The sixth multiplier module 578 may set the first voltage 574 to the current capacitor current 536 multiplied by the impedance conversion value. A seventh multiplier module 580 determines the second voltage 576 based on the impedance conversion value and the voltage difference 520. The seventh multiplier module 580 may set the second voltage 576 to the square of the impedance conversion value multiplied by the voltage difference 520 and divided by two.

A feedback voltage estimation module 582 determines the estimated value of the feedback voltage ($V_{EST}$) 508 based on a third voltage 584 and the predicted capacitor voltage 564. The feedback voltage estimation module 582 may set the estimated value of the feedback voltage 508 to the third voltage 584 plus the predicted capacitor voltage 564. An eighth multiplier module 586 determines the third voltage 584 based on the predicted capacitor current 538 and the capacitor ESR conversion value (yrc). The eighth multiplier module 586 may set the third voltage 584 to the predicted capacitor current 538 multiplied by the capacitor ESR conversion value.

First, second, and third sample and hold (S/H) modules 588, 590, and 592 receive the current capacitor current 536, the current capacitor voltage 558, and the estimated value of the feedback voltage 508, respectively. The first, second, and third sample and hold modules 588, 590, and 592 sample their respective inputs every first sampling period and output samples of their inputs for the first sampling period. The duty cycle module 212 may set the duty cycle 524 based on the samples of the current capacitor current and the current capacitor voltage.

As illustrated and described in conjunction with FIG. 4, by using the parameters of the $A_A$, $B_A$, and $C_A$ matrices and changing the order of the operations performed by the current state estimator module 208, the number of multipliers can be reduced to eight. Die size (area) attributable to the current state estimator module 208 decreases as the number of multipliers decreases.

Additionally, the multiplier modules of FIG. 4 can include floating point/fractional multipliers as opposed to digital signal processor (DSP) core multipliers. DSP core multipliers increase die size relative to floating point/fractional multipliers. DSP core multipliers are also more costly and consume more power than floating point/fractional multipliers. Accordingly, the current state estimator module 208 may consume less power and cost less than a current state estimator module with DSP core multipliers performing similarly.

Figure 5:
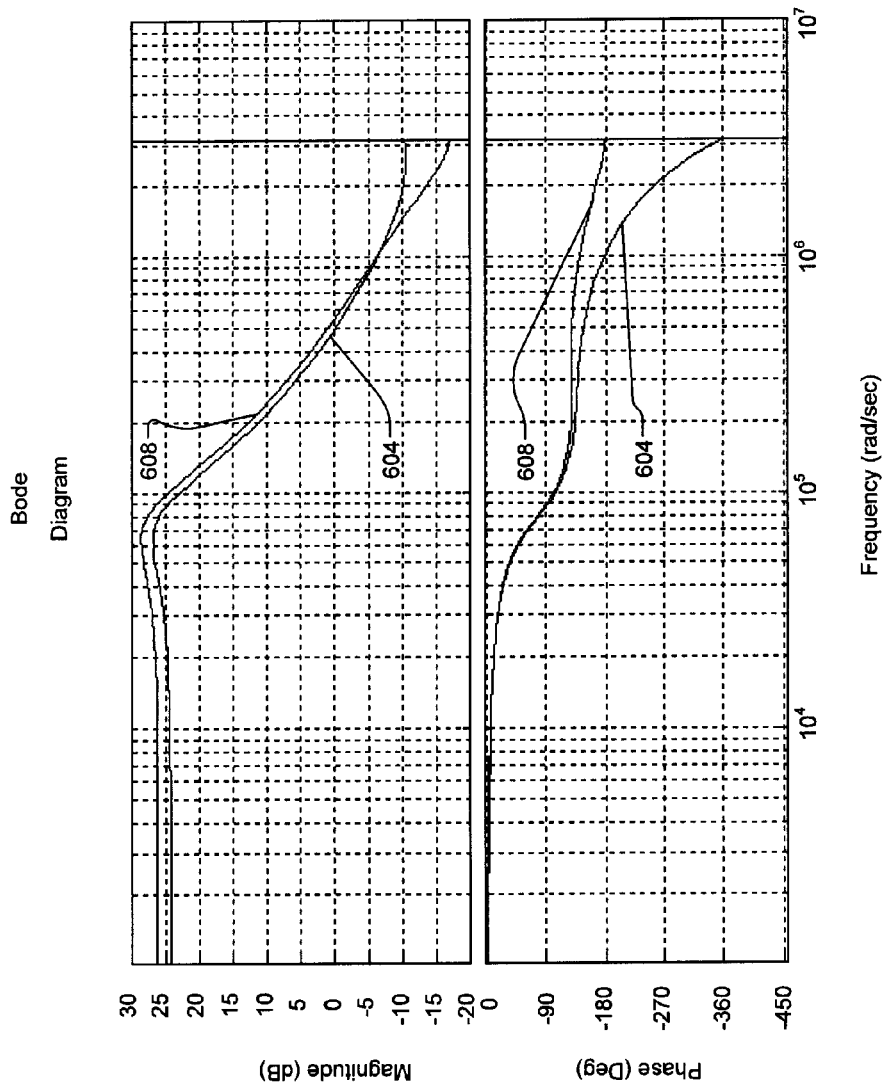
FIG. 5 is an example bode diagram of phase and gain as a function of frequency according to the present disclosure.

Referring now to FIG. 5, an example Bode plot of gain (magnitude) and phase as a function of frequency is presented. Example traces 604 track the feedback voltage 140 in a system where the converter control module 180 includes a PTE. Example traces 608 track the feedback voltage 140 in an implementation where the converter control module 180 includes a CTE, such as in the example of FIG. 4. The bode plot of FIG. 6 illustrates that the converter control module 180 including the CTE provides an improvement in phase margin (PM) relative to the PTE. An increase in PM corresponds to less overshoot in the feedback voltage 140 when a change in the load 136 occurs.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a DC to DC converter, comprising:
an error determination module that determines a voltage error based on an output voltage of the DC to DC converter, an estimated output voltage of the DC to DC converter, and a product of a predetermined delay value and a difference between a duty cycle voltage and a target voltage;
a capacitor current determination module that determines a capacitor current based on the voltage error, a predetermined capacitor current correction value, and a predicted capacitor current;
a capacitor voltage determination module that determines a capacitor voltage based on the voltage error, a predetermined capacitor voltage correction value, and a predicted capacitor voltage;
a duty cycle module that sets the duty cycle voltage for a sampling period based on the capacitor current and the capacitor voltage; and
a pulse width modulation (PWM) module that controls a switching duty cycle of the DC to DC converter based on the duty cycle voltage.

2. The control system of claim 1 wherein the error determination module sets the voltage error equal to the output voltage plus the product minus the estimated output voltage.

3. The control system of claim 1 wherein:
the capacitor current determination module sets the capacitor current to a first sum of:
the predicted capacitor current; and
a product of the voltage error and the predetermined capacitor current correction value; and
the capacitor voltage determination module sets the capacitor voltage to a second sum of:
the predicted capacitor voltage; and
a product of the voltage error and the predetermined capacitor voltage correction value.

4. The control system of claim 1 further comprising a voltage estimation module that determines the estimated output voltage based on the predicted capacitor current and the predicted capacitor voltage.

5. The control system of claim 4 wherein the voltage estimation module sets the estimated output voltage to a sum of:
the predicted capacitor voltage; and
a product of the predicted capacitor current and a capacitor equivalent series resistance (ESR) conversion value.

6. The control system of claim 1 further comprising:
a future current determination module that determines the predicted capacitor current based on the capacitor current, a predetermined impedance conversion value, a predetermined resistance conversion value, the capacitor voltage, and the duty cycle voltage; and
a future voltage determination module that determines the predicted capacitor voltage based on the capacitor voltage, the capacitor current, the predetermined impedance conversion value, and the difference between the duty cycle voltage and the target voltage.

7. The control system of claim 6 wherein the future current determination module sets the predicted capacitor current using the equation:

PCC=CC+wnts*D−rlts*CC, where PCC is the predicted capacitor current, wnts is the predetermined impedance conversion value, rlts is the predetermined resistance conversion value, CC is the capacitor current, and D is a difference between the duty cycle voltage and the capacitor voltage.

8. The control system of claim 7 wherein the future voltage determination module sets the predicted capacitor voltage using the equation:

$$PCV = CV + wnts*CC + D*\frac{wnts^2}{2},$$

where PCV is the predicted capacitor voltage, CV is the capacitor voltage, wnts is the predetermined impedance conversion value, CC is the capacitor current, and D is the difference between the duty cycle voltage and the target voltage.

9. The control system of claim 1 wherein the duty cycle module sets the duty cycle voltage further based on a predetermined feedback voltage value and a predetermined feedback current value.

10. A control method for a DC to DC converter, comprising:
determining a voltage error based on an output voltage of the DC to DC converter, an estimated output voltage of the DC to DC converter, and a product of a predetermined delay value and a difference between a duty cycle voltage and a target voltage;
determining a capacitor current based on the voltage error, a predetermined capacitor current correction value, and a predicted capacitor current;
determining a capacitor voltage based on the voltage error, a predetermined capacitor voltage correction value, and a predicted capacitor voltage;
setting the duty cycle voltage for a sampling period based on the capacitor current and the capacitor voltage; and
controlling a switching duty cycle of the DC to DC converter based on the duty cycle voltage.

11. The control method of claim 10 further comprising setting the voltage error equal to the output voltage plus the product minus the estimated output voltage.

12. The control method of claim 10 further comprising:
setting the capacitor current to a first sum of:
the predicted capacitor current; and
a product of the voltage error and the predetermined capacitor current correction value; and
setting the capacitor voltage to a second sum of:
the predicted capacitor voltage; and
a product of the voltage error and the predetermined capacitor voltage correction value.

13. The control method of claim 10 further comprising determining the estimated output voltage based on the predicted capacitor current and the predicted capacitor voltage.

14. The control method of claim 13 further comprising setting the estimated output voltage to a sum of:
the predicted capacitor voltage; and
a product of the predicted capacitor current and a capacitor equivalent series resistance (ESR) conversion value.

15. The control method of claim 10 further comprising:
determining the predicted capacitor current based on the capacitor current, a predetermined impedance conversion value, a predetermined resistance conversion value, the capacitor voltage, and the duty cycle voltage; and
determining the predicted capacitor voltage based on the capacitor voltage, the capacitor current, the predetermined impedance conversion value, and the difference between the duty cycle voltage and the target voltage.

16. The control method of claim 15 further comprising setting the predicted capacitor current using the equation:

PCC=CC+wnts*D−rlts*CC where PCC is the predicted capacitor current, wnts is the predetermined impedance conversion value, its is the predetermined resistance conversion value, CC is the capacitor current, and D is a difference between the duty cycle voltage and the capacitor voltage.

17. The control method of claim 16 further comprising setting the predicted capacitor voltage using the equation:

$$PCV = CV + wnts*CC + D*\frac{wnts^2}{2},$$

where PCV is the predicted capacitor voltage, CV is the capacitor voltage, wnts is the predetermined impedance conversion value, CC is the capacitor current, and D is the difference between the duty cycle voltage and the target voltage.

18. The control method of claim 10 further comprising setting the duty cycle voltage further based on a predetermined feedback voltage value and a predetermined feedback current value.

19. A control method for a DC to DC converter, comprising:

setting a voltage error equal to an output voltage of the DC to DC converter minus an estimated output voltage of the DC to DC converter plus a product of a predetermined delay value and a difference between a duty cycle voltage and a target voltage;

determining a capacitor current based on the voltage error;

determining a capacitor voltage based on the voltage error;

setting the duty cycle voltage for a sampling period based on the capacitor current and the capacitor voltage; and controlling a switching duty cycle of the DC to DC converter based on the duty cycle voltage.

20. A control system for a DC to DC converter, comprising:

an error determination module that sets a voltage error equal to an output voltage of the DC to DC converter minus an estimated output voltage of the DC to DC converter plus a product of a predetermined delay value and a difference between a duty cycle voltage and a target voltage;

a capacitor current determination module that determines a capacitor current based on the voltage error;

a capacitor voltage determination module that determines a capacitor voltage based on the voltage error;

a duty cycle module that sets the duty cycle voltage for a sampling period based on the capacitor current and the capacitor voltage; and a pulse width modulation (PWM) module that controls a switching duty cycle of the DC to DC converter based on the duty cycle voltage.

21. A control system for a DC to DC converter, comprising:

a voltage estimation module that determines an estimated output voltage of the DC to DC converter based on a predicted capacitor current and a predicted capacitor voltage;

an error determination module that determines a voltage error based on an output voltage of the DC to DC converter, the estimated output voltage of the DC to DC converter, and a product of a predetermined delay value and a difference between a duty cycle voltage and a target voltage;

a capacitor current determination module that determines a capacitor current based on the voltage error;

a capacitor voltage determination module that determines a capacitor voltage based on the voltage error;

a duty cycle module that sets the duty cycle voltage for a sampling period based on the capacitor current and the capacitor voltage; and a pulse width modulation (PWM) module that controls a switching duty cycle of the DC to DC converter based on the duty cycle voltage.

* * * * *

UNITED STATES PATENT AND TRADEMARK OFFICE
CERTIFICATE OF CORRECTION

PATENT NO.       : 8,901,899 B1                                Page 1 of 1
APPLICATION NO.  : 13/230311
DATED            : December 2, 2014
INVENTOR(S)      : Mansur Kiadeh et al.

It is certified that error appears in the above-identified patent and that said Letters Patent is hereby corrected as shown below:

In the Specification:

| | |
|---|---|
| Column 4, Line 47 | Delete "($V_{Sw}$)" and insert --($V_{SW}$)-- |
| Column 6, Line 33 | Delete "224" and insert --214-- |
| Column 6, Line 50 | Delete "222" and insert --220-- |
| Column 6, Line 52 | Delete "216," and insert --212,-- |

Signed and Sealed this
Thirty-first Day of March, 2015

Michelle K. Lee
*Director of the United States Patent and Trademark Office*